United States Patent [19]

Magil

[11] 4,425,477

[45] Jan. 10, 1984

[54] TELEPHONE LINE TRIGGERED ATTENUATOR

[75] Inventor: Paul A. Magil, Long Beach, Calif.

[73] Assignee: Paul Alan Magil & Associates, Costa Mesa, Calif.

[21] Appl. No.: 346,435

[22] Filed: Feb. 8, 1982

[51] Int. Cl.³ .......................................... H04M 11/00
[52] U.S. Cl. .................................... 179/2 B; 381/105
[58] Field of Search ................... 179/2 B, 2 A, 2 AM, 179/1 VL; 381/104–109

[56] References Cited

U.S. PATENT DOCUMENTS

| | | | |
|---|---|---|---|
| 1,775,567 | 9/1930 | Lewis . | |
| 1,909,843 | 5/1933 | Squire | 179/2 B |
| 1,966,184 | 7/1934 | O'Neill | 179/2 B |
| 2,212,792 | 8/1940 | Reading . | |
| 2,498,349 | 2/1950 | Van Velsor | 179/2 |
| 2,503,095 | 4/1950 | Butler | 179/2 |
| 2,792,450 | 5/1957 | Hof | 179/2 |
| 3,036,158 | 5/1962 | Romano | 179/1 VL |
| 3,446,976 | 5/1969 | Shaw | 250/217 |
| 3,532,823 | 10/1970 | Ellis | 179/2 |

Primary Examiner—G. Z. Rubinson
Assistant Examiner—W. J. Brady
Attorney, Agent, or Firm—Caesar, Rivise, Bernstein & Cohen, Ltd.

[57] ABSTRACT

A device which automatically decreases the audio output of an audio system while a telephone is being used. The device includes sensor and control means, relay means, mode selection means and attenuation means. When the handset is removed from its cradle on a conventional telephone, an electrical signal is produced. The sensor and control means detects this signal and causes the relay means to interact with the attenuation means to effectuate a predetermined decrease in the audio output level of the audio system. The device automatically restores the audio output to its previous level upon the handset being returned to its normal position on the telephone cradle. The device's mode selection means enables one to operate the device in either an automatic mode, an attenuate mode or in a bypass (i.e., off) mode. Moreover, the device is designed to be directly attached to the telephone line rather than to the specific telephone and may be connected to a conventional audio system without the necessity of making modifications to the audio equipment.

12 Claims, 4 Drawing Figures

FIG. 2
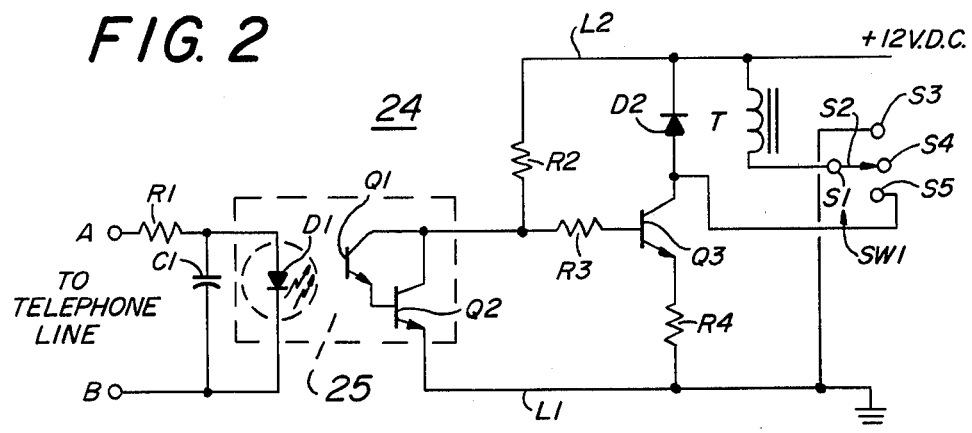
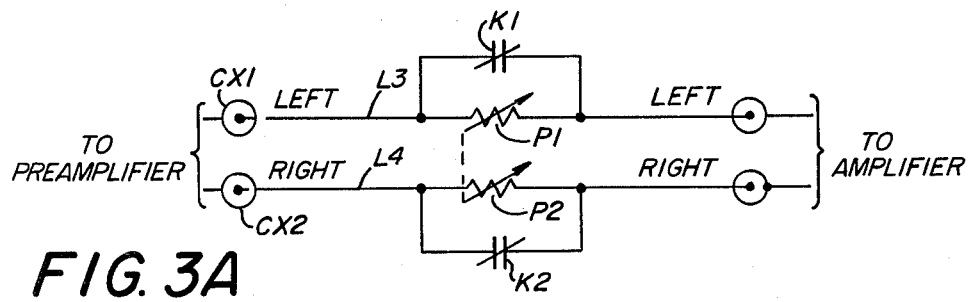
FIG. 3A
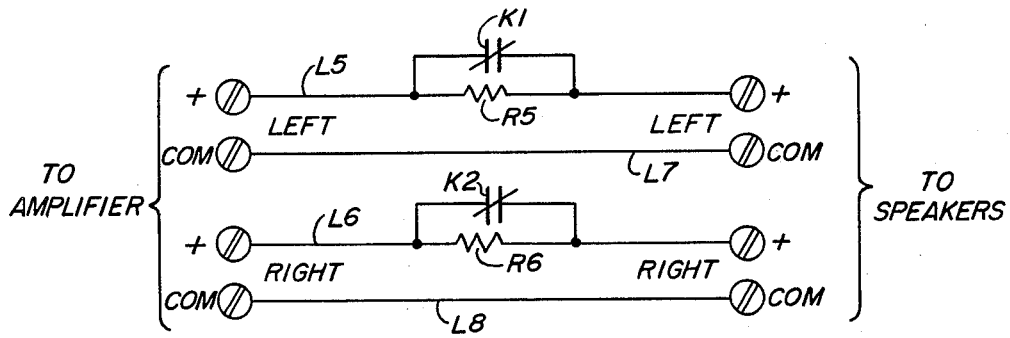
FIG. 3B

TELEPHONE LINE TRIGGERED ATTENUATOR

BACKGROUND OF THE INVENTION

This invention relates generally to audio systems, and more particularly to a device for automatically attenuating an audio system when a coupled telephone is used.

Since it is difficult, if not impossible, to carry-on a telephone conversation while an adjacent audio system is playing at a moderate to loud volume level, the instant invention provides a convenient means for either manually or automatically decreasing the volume of the audio system while a telephone is being used.

Prior art, audio attenuating devices come in a wide variety of designs. Generally speaking, these devices can be broken down into two categories of devices, namely, mechanically actuated and electronically actuated devices.

Mechanically actuated devices generally employ a switching means which opens or closes a circuit for decreasing (attenuating) audio coincidental with the telephone user's picking up the telephone handset. One such device is disclosed in U. S. Pat. No. 3,532,823 (Ellis). The Ellis device utilizes a fairly simple switch means for actuating the attenuation circuitry. In that regard, in that Ellis device when the telephone handset is picked up from the telephone, the telephone handset is disengaged from contact with a switch lever, permitting the switch to move to an open position which in turn actuates to attenuation circuitry, thereby decreasing the audio output level of the audio system.

Many of the other mechanically actuated devices are far more complex than the one disclosed by Ellis. For instance, U. S. Pat. No. 2,792,450 (Hof) discloses and claims an automatic telephone cut-off switch which utilizes a complicated base structure upon which the telephone rests. This base structure is essentially a type of balance or weighing scale which is calibrated to the weight of the particular telephone resting thereon. Thus, when the handset portion is removed from the telephone, the base portion responds to the decrease in weight, causing a switching mechanism attached thereto to actuate the attenuation circuitry of the device.

As should be apparent, devices such as these which utilize mechanical switching means tend to alter the general apperance of the telephone by necessitating the use of accessory members which are to be attached to, or lie adjacent the telephone. Furthermore, as is generally the case with devices employing mechanical switching means, these devices are subject to the possibility of mechanical switching failures which would cause the device to malfunction.

An electronically actuated device which operates to attenuate an audio system conincidental with the ringing of a telephone is disclosed in U.S. Pat. No. 3,445,976 (Shaw). The Shaw device which is electronically coupled to the ring-producing circuitry of the telephone, overcomes the above mentioned disadvantages inherent in mechanically actuated attenuating devices. However, the Shaw device has certain other limitation which greatly diminish its utility.

One limitation of the Shaw device is that once the telephone conversation has been completed, the attenuating means must be manually disengaged in order to restore the volume of the audio system to its normal level. It should be quite obvious that the advantage of using a device designed to afford one the convenience of not having to manually turn down the volume of an audio system prior to conducting a telephone conversation would be greatly diminished by a device requiring the user of the device to manually disengage its operation following the completion of the telephone conversation. Moreover, in being coupled to the ring-producing circuitry of the telephone, the Shaw device's automatic attenuating capability is totally inoperative in situations where the one using the device is the one initiating the telephone call.

With regard to the attenuation means for actually decreasing the audio output, many of the prior art devices utilize circuitry which either completely turns off the audio of the audio system or alternatively, is connected to the audio system in a manner which entails the modification of the amplification circuitry of the audio system. For instance, in the Shaw patent the attenuating means is connected directly to the audio system's amplifier circuitry. Thus, the Shaw device requires actual modification of the audio circuitry, clearly dependent upon the specific equipment in use. Moreover, the nature and scope of the modification is not generally known and may not readily be implemented by an average user. As a result, there is the inherent possibility that the normal performance of the audio system will be affected by the device.

Likewise, the devices which completely disengage the audio system are also considered undesirable since many people do not want to completely turn the audio off during a telephone conversation but merely wish to decrease its volume.

Other devices for attenuating or cutting off audio of a connected audio system in response to use of a telephone are disclosed in the following U.S. Pat. Nos. 2,498,349 (Van Velsor); 1,775,567 (Lewis); 2,212,792 (Reading); and 2,503,095 (Butler).

OBJECTS OF THE INVENTION

Accordingly, it is a general object of the instant invention to provide a device which overcomes the disadvantages inherent in the prior art telephone operated muting devices.

It is a further object of the instant invention to provide a device for an audio system which is electrically coupled to a conventional telephone such that upon one's removing the telephone handset from the cradle, the audio level is decreased a predetermined amount.

It is still a further object of the instant invention to provide a telephone coupled attenuating device which not only attenuates the volume of an audio system upon the removal of the telephone handset from its normal position on the cradle, but also automatically restores the volume of the audio system to its previus level upon the handset being returned to the cradle.

It is still a further object of the instant invention to provide a telephone actuated attenuating device for attenuating the audio output of an audio system, where said device need not be connected directly to the telephone itself but may be connected at a remote location to the telephone line.

It is still a futher object of the instant invention to provide a telephone operated attenuating device for attenuating the audio output of an audio system which attenuates but does not in any other way alter the sound or performance of the audio system in which it is attached without modification.

It is still a further object of the instant invention to provide a telephone operated attenuating device for use with an audio system and which is arranged to either reduce the audio output automatically upon use of a coupled telephone or manually upon actuation of an actuating element.

SUMMARY OF THE INVENTION

These and other objects of the instant invention are achieved by providing a device for use with a conventional telephone to attenuate the audio output of an audio system when the telephone is in use. The device comprises attenuating means responsive to an electrical signal produced when the handset is lifted from the telephone's cradle, to attenuate the audio output of the audio system to a predetermined level until such time that the telephone handset is returned to its normal position. Upon the handset being returned to its normal position, the audio output of the audio system is restored to its previous established level.

Other objects and many of the attendant advantages of the instant invention will become readily apparent by reference to the accompanying drawing wherein:

DESCRIPTION OF THE DRAWING

FIG. 2 is a schematic diagram of a portion of sensor, control and relay circuitry of the device of the instant invention;

FIG. 3-a is a schematic diagram of a portion of the relay and attenuator circuitry of the device of the instant invention shown connected to one of the audio systems shown in FIG. 1; and FIG. 3-b is a schematic diagram of a portion of the relay and attenuator circuitry of the device of the instant invention shown connected to the other of the audio systems shown in FIG. 1.

DETAILED DESCRIPTION OF PREFERRED EMBODIMENT

Figure 1:
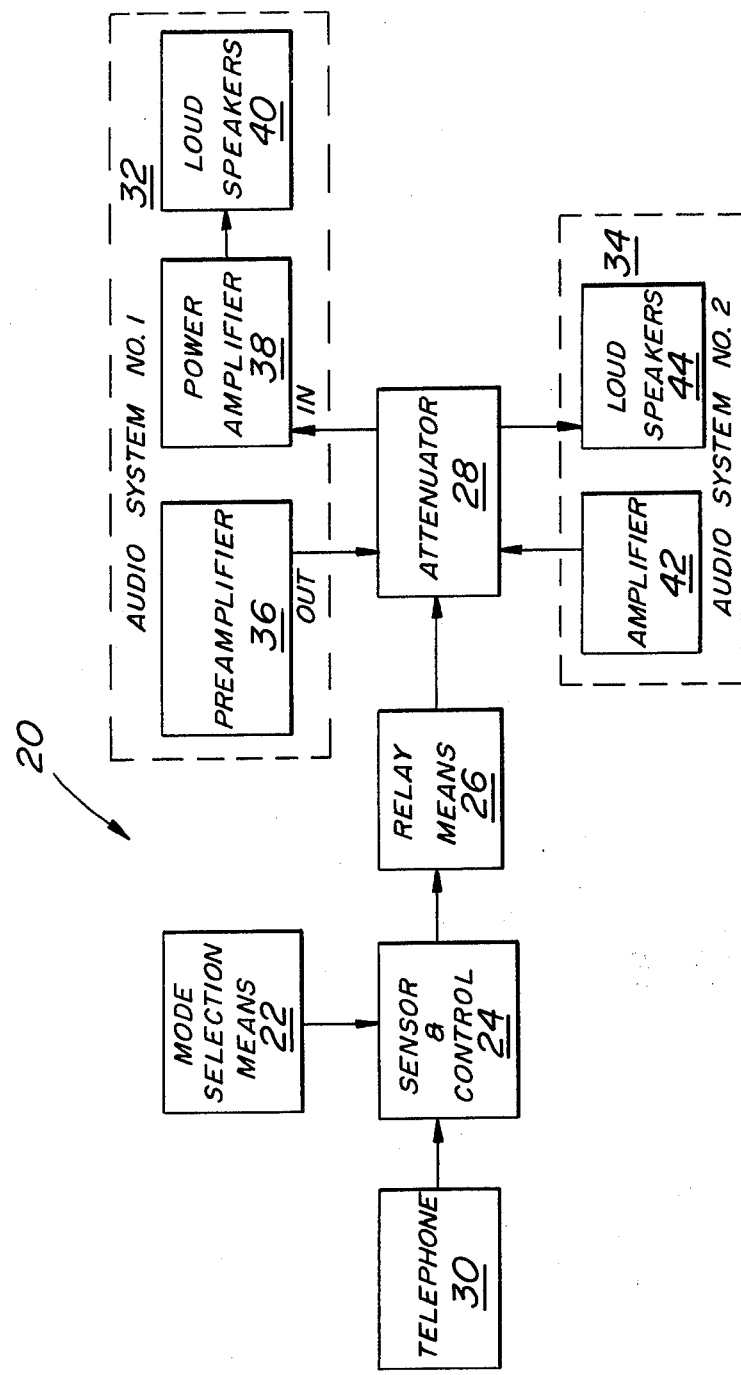
FIG. 1 is a functional block diagram of the device of the instant invention shown connected to a conventional telephone and two types of conventional audio systems.

Referring now to the various figures of the drawing wherein like reference characters refer to like parts, there is shown at 20 in FIG. 1, the device of the instant invention connected to two types of conventional audio systems.

The system 20 basically comprises mode selection means 22, sensor and control means 24, relay means 26 and attenuator means 28. The device 20 is connected to a conventional telephone 30, in a manner to be described later, and to a conventional audio system. In FIG. 1 two types of conventional audio systems are shown, namely, a system 32 including a separate preamplifier and amplifier and a system 34 including an integrated amplifier.

The device 20 operates to attenuate the audio output of the speaker(s) of either audio system 32 or 34 in response to the handset (not shown) of the telephone 30 being lifted from its cradle (not shown) when the device is in its automatic mode of operation. The device 20 can also be used to attenuate the audio in response to a manual signal when it is in a manual mode of operation. Finally, the device can be isolated from the audio system to enable the audio output to be unaffected by the condition of the telephone when the device is in the bypass mode.

The audio system 32 basically comprises a preamplifier 36, a power amplifier 38 and a pair of loud speakers 40. The audio system 34 basically comprises an amplifier 42 and a pair of loud speakers 44.

The sensor and control means 24 (FIG. 2) is coupled to the telephone 30 and is arranged to receive attenuating actuating signals therefrom, as will be described later. The mode selection means 22 serves as the means for establishing either the automatic, manual or bypass mode of operation of the device, as will also be described later.

In a conventional telephone system, an "off hook" voltage drop occurs in the telephone line when the handset is removed from the handset support structure of the telephone. Such support structure will be referred to hereinafter, as the handset cradle. The sensor and control means 24 of the instant invention detects the "off hook" voltage drop and in response thereto produces a signal to actuate the relay means 26. This action inserts the attenuator means 28 into the audio path of the connected audio system to attenuate the audio output provided to the speakers. The attenuating means 28 basically comprises a resistor to be described later, connected in series in each audio signal line and shunted by a normally closed pair of contacts of the relay means 26 so that when the contact are closed, the resistor is shunted out of the signal path and thus, the audio signal is unattenuated. When attenuation is desired, either in the automatic mode or in the manual mode, the relay contacts open, thereby electrically placing the resistor(s) in the signal paths to reduce audio volume to the predetermined level as established by the resistance of the resistors.

In FIG. 22 there is shown the circuitry making up the mode selector means 22, the sensor and control means 24, and a portion of the relay means 26.

Basically, the sensor and control circuitry 24 comprises a pair of input terminals A and B connected across the telephone signaling lines. As is known in the art, when the telephone handset is in the cradle, i.e., is "on hook" and the telephone is not ringing the voltage appearing on the signalling lines is 48 volts. When the telephone rings with the handset still "on hook", the voltage increases to 90 volts at 20 Hz with an approximate 2 second repetition time. When the handset is removed from the cradle, i.e., the phone is "off hook", the voltage drops to 6 VDC. One side of a resistor R1 is connected to terminal A. The other side of the resistor R1 is connected to the common junction of one side of a capacitor C1 and to the anode of a light emitting diode D1. The light emitting diode D1 forms a portion of an optical coupler 25 (shown in FIG. 2), to be described later. The cathode of diode D1 is connected to the other side of capacitor C1 and to the other terminal B. The optical coupler also includes a pair of transistors Q1 and Q2 connected as a Darlington pair. The transistor Q1 is light responsive, with its emitter connected to the base of transistor Q2. The collector of transistor Q1 is connected to the collector of transistor Q2. The emitter of transistor Q2 is connected to line L1. Line L1 is connected to an appropriate potential, e.g., ground. The collectors of Q1 and Q2 are connected together to the common junction of resistors R2 and R3. The other side of resistor R2 is connected to the cathode of diode D2 and line L2. Line L2 is also connected to an appropriate potential, e.g., +12 VDC. The other side of resistor R3 is connected to the base of a transistor Q3. The collector of transistor Q3 is connected to the common junction of the anode of a diode D2 and a contact S5 of a single pole, triple throw switch SW1. The emitter of transistor Q3 is connected to one side of a resistor R4. The other side of resistor R4 is connected to the common junction of the line L1 and contact S3 of switch SW1. The relay means 26 includes a coil T connected between line L2 and a common contact S1 of switch SW1. The switch SW1 includes another contact S3 connected to line L1 and isolated contact S4 and a movable contactor S2 connected to the common contact S1. The movable contact is arranged to be moved manually into electrical engagement with either contact S3, contact S4 or contact S5 to establish the mode of operation of device 20.

The optical coupling circuit 25 mentioned above, which includes a light emitting diode D1 and a Darlington pair of transistors Q1 and Q2 operates as a means for actuating the relay means 26 without any direct electrical connection between the relay means 26 and the telephone line. To that end, diode D1, of the optical coupler 25 does not emit light in response to a voltage drop occurring in the telephone line when the telephone handset is taken "off hook". Transistor Q1 which is a light sensitive transistor, receives no emitted light and in response thereto, triggers Q2 into a conduction. This signal energizes relay coil T1 which causes the associated relay contacts, to be described later, to open, thereby resulting in the attenuation of the audio signal.

Thus, the audio system 32 or 34 is electrically isolated from the telephone line.

The switch SW1 serves as the mode selection means 22 so that when contactor S2 is in contact with contact S3, the coil is immediately energized and the device is in the manual mode of operation. In this mode of audio output is immediately attenuated in response to movement of the switch contactor into contact with S3. When the contactor S2 is in contact with isolated contactor S4, the coil T is precluded from being energized and thus, the device is in the "bypass mode" wherein it does not effect any audio attenuation. When the switch contactor S2 is moved into contactor with contactor S5, the devices is in the automatic mode, whereupon audio output is attenuated in automatic response to the generation of an "off hook" signal, i.e., when the handset is removed from its cradle.

The contacts of the relay means 26 are shown clearly in FIGS. 3-a and 3-b. Thus, the relay means comprises two pairs of normally closed contacts K1 and K2 coupled to the coil T.

As noted earlier, the attenuator circuit 28 is shown in FIG. 3-a and 3-b as two separate embodiments. In the embodiment shown in FIG. 3-a, the attenuator interconnects the preamplifier 36 of a stereo audio system 32 to its power amplifier 38. To that end, a potentiometer P1 is connected in the signal conductor L3 of an audio connector which preferrably also includes an "RCA" or "PHONO" Jack, in conventional use, connected between the left output of the preamplifier and the left input of the power amplifier. A similar potentiometer P2 is connected in the signal conductor L4 of an audio connector which preferably also includes an RCA or PHONO Jack, in conventional use, connected between the right output of the preamplifier and the right input of the power amplifier. The normally closed pair of contacts K1 is connected in shunt across potentiometer P1, while the normally closed contacts K2 is connected in shunt across potentiometer P2.

The potentiometers P1 and P2 establish the degree of attenuation of the audio signal when the relay contacts open. In accordance with a preferred embodiment of this invention, the potentiometers are ganged so that both stereo channels are attenuated equally. The use of potentiometers is optional but is shown in lieu of resistors herein, for use in audio applications in which the attenuators are connected between the preamplifier and power amplifier to accommodate various signal levels of different brands of audio equipment.

In an audio system including an integrated amplifier or receiver, the attenuating means is connected between the amplifier 42 and the loud speakers 44, as shown in FIGS. 1 and 3-b.

Thus, as can be seen in FIG. 3-b, the primary difference between attenuator 28 in system 34 from attenuator 28 in system 32 is that the latter uses a pair of fixed power resistors R5 and R6 in the actual loudspeaker (power) circuit from the power amplifier instead of the ganged pair of potentiometers P1 and P2 in the power amplifier input (Voltage) circuit from the preamplifier.

Referring to FIG. 3-b, the resistor R5 is connected in series in the + line L5 between the left audio output channel and the left speaker + connector. An identical resistor R6 is connected in series in the + line L6 between the right audio output channel and the right speaker + connector. Line L7 and L8 are the common conductors connected between the audio output and the speakers for the left and right channels, respectively.

In a typical embodiment of the instant invention the comonents identified heretofore have the following values and identification:

| COMPONENT | MANUFACTURER | VALUE |
| --- | --- | --- |
| Resistor R1 | | 10K ohms |
| Resistor R2 | | 5K ohms |
| Resistor R3 | | 5K ohms |
| Resistor R4 | | 62 ohms |
| Ganged Potentiometer P1, P2 | | 500K ohms |
| Resistor R5 | 100 ohms - 10 watt | |
| Resistor R6 | | 100 ohms - 10 watt |
| Optical Coupler 25 | SYLVANIA (ECG 3045) | |
| Transistor (Q3) | SYLVANIA ECG 123) | |
| Relay | OMRON (G2V-2-DC12) | |
| Diode D2 | | IN4002 |
| Switch SW1 | | Single Pole, triple throw |
| Capacitor C1 | | 47uf |

As mentioned above, the device 20 operates in one of three possible modes, namely, the attenuate mode, the bypass mode and the automatic mode.

Referring to FIG. 2, when the movable contactor S2 of the mode selection switch SW1 is positioned to contact the stationary contact S3, the device 20 is placed in the attenuate mode of operation. While in the attenuate mode, the 12 volt source of direct current, which is applied to line L2, passes through and energizes the relay coil T on its way to the common ground, causing the relay contacts K1 and K2 (shown in FIGS. 3-a and 3-b) to open from their normally closed position. The opening of the relay contacts, in turn causes the audio signal to pass through the resistive means, namely, potentiometers P1 and P2 or resistors R5 and R6 to effectuate a predetermined amount of decrease in the audio level as determined by the resistance of either the potentiometers P1 and P2 or the resistors R5 and R6 (depending on which audio system is being used).

Again referring to FIG. 2, when movable contactor S2 is positioned to contact stationary contact S4, the device 20 is placed in the bypass mode. This occurs as a result of stationary contact S4 being isolated. In the bypass mode, the audio level is unaffected by the device, irrespective of whether the telephone handset is "off hook" or not.

In the bypass mode, since contact S4 is isolated, no current flows through the relay coil K1 and thus, the coil K1 is not energized. As a result, the relay contacts (as shown in FIGS. 3-a and 3-b) remain in their normally closed position to enable the audio signal to bypass the resistive elements, either P1 and P2 or R5 and R6 and thus, no attenuation results.

Once again referring to FIG. 2, by positioning the movable contactor S2 to a position where it is in contact with stationary contact S5, the device 20 is placed in the automatic mode of operation. In the automatic mode of operation, attenuation occurs only when the telephone handset is "off hook". When the handset is taken "off hook" a voltage drop occurs across the telephone line which causes the light emitting diode D1 not to emit light which is then not received by the light sensitive transistor Q1. As a result, transistor Q1 generates an electrical signal which is received by the base of transistor Q2. Transistor Q2 in response to that signal, generates another electrical signal which is received by the base of transistor Q3. As a result, transistor Q3 produces an electrical current which passes through and energizes the relay coil T. The energized relay coil causes the relay contacts K1 and K2 (as shown in FIGS. 3-a and 3-b) to open from their normally closed position. The opening of the relay contacts, in turn causes the audio signal to pass through the resistive means, either potentiometers P1 and P2 or resistors R5 and R6 (depending upon which audio system is being used) to effectuate a predetermined amount of decrease in the audio level as determined by the resistance of either the potentiometers P1 and P2 or the resistors R5 and R6.

As will be appreciated from the foregoing, the device 20 is relatively simple in construction, inexpensive to produce and is a highly effective means for either automatically or manually lowering the volume of a coupled audio system while using a telephone. Moreover, the device 20 is designed to operate in combination with both sophisticated audio systems utilizing separate amplifiers and preamplifiers 32 as well as less sophisticated systems 34 which utilizes a single amplification unit. With regard to either system, the device is designed to effectuate the attenuation without in any other way affecting the quality of the audio output or requiring actual modification of said system or its components.

Without further elaboration, the foregoing will so fully illustrate my invention that others may, by applying current or future knowledge, readily adapt the same for use under various conditions of service.

I claim:

1. A device for direct connection to a conventional telephone line at any point thereon, said telephone line forming a part of a telephone system including a telephone having a handset, said telephone system producing a first electrical signal when said handset is lifted and a second electrical signal when said handset is replaced, said device being arranged for decreaasing the audio output of an electrical audio system and without modifying the construction of said telephone, said audio system including an amplifier and a speaker, wherein said device comprises high impedance isolating means responsive to said first electrical signal and attenuation means responsive to said electrical isolating means for attentuating the audio output of said audio system to a predetermined level until said second signal is produced by said system, whereupon said device automatically restores said audio output to its previous level.

2. The device of claim 1, wherein said means responsive to said first electrical signal comprises relay means and attenuating means.

3. The device of claim 2, wherein said audio system includes a preamplifier and amplifier and said attenuating means is connected between said preamplifier and said amplifier.

4. The device of claim 2, wherein said attenuating means is connected between said amplifier and said speaker.

5. The device of claim 3, wherein the means for attenuating said audio output comprises a resistance means and relay means.

6. The device of claim 4, wherein the means for attenuating said audio output comprises a resistance means and relay means.

7. The device of claim 2, wherein said attenuating means is variable enabling one to readily vary said predetermined level to which said audio output is being attenuated.

8. The device of claim 2, wherein said attenuating means comprises an LED which becomes illuminated in response to said electrical signal which is produced when said handset is lifted, an optical isolator and a transistor which is coupled to said LED by means of said optical isolator with said transistor emitting an electrical current to actuate said attenuater means responsive to said LED becoming illuminated.

9. The device of claim 3, wherein said audio system is a two channel stereo system, with said attenuating means being connected between each stereo channel of said preamplifier and its respective stereo channel of said amplifier.

10. The device of claim 4, wherein said audio system is a two channel stereo system with said attenuating means being connected between each stereo channel of said amplifier and its respective speaker.

11. The device of claim 1, further comprising mode selection means which in a first setting position attenuates said audio output irrespective of the occurrence of either said first or said second electrical signal, in a second setting position precludes attenuation of said audio output irrespective of the occurrence of either said first or said second electrical signal and in a third setting position automatically attentuates said audio output responsive to said first electrical signal and automatically restores the level of said audio output responsive to said second electrical signal.

12. The device of claim 11, wherein said mode selection means comprises a selctor switch.

* * * * *